(12) United States Patent
Gubbels et al.

(10) Patent No.: US 7,839,978 B2
(45) Date of Patent: Nov. 23, 2010

(54) DEVICE FOR GENERATING X-RAYS AND USE OF SUCH A DEVICE

(75) Inventors: Godefridus Hendricus Maria Gubbels, Helmond (NL); Johannes Petrus Zijp, Oisterwijk (NL)

(73) Assignee: Nederlandse Organisatie voor toegepast-natuurwetenschappelijk Onderzoek TNO, Delft (NL)

(*) Notice: Subject to any disclaimer, the term of this patent is extended or adjusted under 35 U.S.C. 154(b) by 39 days.

(21) Appl. No.: 12/158,749

(22) PCT Filed: Dec. 22, 2006

(86) PCT No.: PCT/NL2006/000655

§ 371 (c)(1), (2), (4) Date: Dec. 3, 2008

(87) PCT Pub. No.: WO2007/073172

PCT Pub. Date: Jun. 28, 2007

(65) Prior Publication Data

US 2009/0296888 A1 Dec. 3, 2009

(30) Foreign Application Priority Data

Dec. 23, 2005 (EP) .................................. 05077975

(51) Int. Cl.
*H01J 35/00* (2006.01)
*H01J 35/06* (2006.01)
(52) U.S. Cl. ........................................ 378/122; 378/136
(58) Field of Classification Search ................ 378/119, 378/123, 136, 137, 138, 143, 122
See application file for complete search history.

(56) References Cited

U.S. PATENT DOCUMENTS

| 6,259,765 | B1 * | 7/2001 | Baptist | 378/136 |
| 6,333,968 | B1 * | 12/2001 | Whitlock et al. | 378/136 |
| 7,012,266 | B2 * | 3/2006 | Jin | 250/492.2 |
| 2003/0142790 | A1 | 7/2003 | Zhou et al. | |
| 2004/0240616 | A1 * | 12/2004 | Qiu et al. | 378/136 |

FOREIGN PATENT DOCUMENTS

| EP | 1209719 A1 | 5/2002 |
| EP | 1302963 A2 | 4/2003 |
| EP | 1520603 A1 | 4/2005 |
| JP | 2005056592 | 3/2005 |

OTHER PUBLICATIONS

International Search Report for PCT/NL2006/000655 dated Jul. 24, 2007.

* cited by examiner

*Primary Examiner*—Irakli Kiknadze
(74) *Attorney, Agent, or Firm*—Leydig, Voit & Mayer Ltd (57) ABSTRACT

Device for generating X-rays, comprising:
a field emission cathode (10) configured to emit electrons when an electrical field is applied to the cathode (10); and
an anode (20), the anode being configured to generate X-rays as a result of receiving electrons from the field emission cathode (10); wherein the cathode (10) comprises an electron emission surface (S) extending opposite the anode (20), the cathode (10) being configured to emit electrons substantially from the electron emission surface (S) during use.

23 Claims, 4 Drawing Sheets

DEVICE FOR GENERATING X-RAYS AND USE OF SUCH A DEVICE

FIELD OF THE INVENTION

The invention relates to a device for generating X-rays and the use of such a device.

BACKGROUND

Various X-ray generating devices are known from the prior art. In a known device, X-ray are generated by directing electrons, emitted by a cathode, onto an anode, the anode emitting the X-rays as a result of receiving the electrons from the cathode. In the known device, a vacuum separates the cathode and anode.

A lot of research has been done to provide the device with a suitable electron emitting cathode. For example, it is known to apply carbon-nanotubes to the X-ray apparatus, see for example US 2003/0142790A1 or US2004/0114721A1, to emit the electrons by field emission. Besides, it is known to apply arrays of lithographically manufactured sharp cones to emit the electrons. In such devices, generally, electrons are being emitted directly from sharp tips or edges into a vacuum due to an electrical field, to be attracted by the anode. Also, in such devices, the emission of the electrons can be achieved at a relatively low temperature.

However, such known X-ray generator devices are relatively expensive and complex, and generally take relatively many different manufacturing steps to produce.

SUMMARY OF THE INVENTION

An object of the present invention is to solve or alleviate the above-mentioned problems. Particularly, the present invention aims to provide a relatively simple and inexpensive X-ray generating device.

According to the invention, there is provided a device that is characterised by the features of claim 1.

Such a device, particularly the cathode thereof, can be manufactured in a relatively simple and inexpensive manner. Besides, since the cathode emits electrons substantially from the electron emission surface, and for example substantially not from edges or sharp tips—as in known devices, a single relatively homogeneous, broad electron beam can be provided, which can lead to a relatively homogeneous X-ray distribution during use.

A basic idea of the present invention is to apply a cathode comprising an electron emission surface in an X-ray generating device. For example, the cathode can be a so called flat MIM (metal-insulator-metal) emitter. The application of a flat MIM emitter has been investigated concerning flat-panel displays. Until the present day, no one came to the simple insight that a MIM emitter can be advantageously applied in the generation of X-rays. Besides, for example, the cathode can be a semiconductor-insulator-semiconductor emitter, also known as a ballistic electron emission (BEE), a printable field emitter (PFE), a surface conduction emitter (SCE), or a different suitable emitter.

In an aspect, the device according to the invention is used to irradiate at least part of a species and/or tissue, for example a human or animal body, with X-rays. This can provide the above-mentioned advantages. The device can provide a controlled irradiation. Also, during use, the device can produce a relatively homogeneous, and preferably relatively broad, beam of X-rays.

Also, an aspect of the invention relates to a method for manufacturing a device for generating X-rays, for example a device according to the invention. Advantageously, the method comprises
   providing a substrate;
   providing the substrate with one or more layers to provide an electron field emission cathode, the cathode being configured to emit electrons substantially from an electron emission surface of the cathode;
   providing an anode, configured to generate X-rays as a result of receiving electrons from the cathode.

Thus, a device for generating X-rays can be manufactured in a relatively simple manner, for example preferably without having to rely on the application of carbon-nanotubes and/or lithographically manufacturing of a large number of sharp electron emission tips or sharp electron emission edges.

In a further embodiment, at least part of the cathode is being provided using a printing technique, particularly inkjet printing, wherein an ink comprising conducting and/or semiconductor particles is being printed onto a substrate or onto an electrode. In this way, the device can be provided with a mentioned a printable field emitter (PFE).

In an further embodiment, at least one layer of the cathode is a conducting or semiconductor layer, which layer is being interrupted or broken, at least viewed in a direction parallel to the layer, to provide a surface conduction emitter (SCE).

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE DRAWINGS

FIGS. 1-4 schematically depict a first embodiment of the invention. The embodiment comprises a device 1 for generating X-rays. For example, the device 1 can be used to irradiate at least part of a species and/or tissue, for example a human or animal body, with X-rays. For example, the device can be used in a medical treatment, for example brachytherapy or a restenosis treatment, or alternatively in medical or materials analysis, or otherwise.

Figure 1:
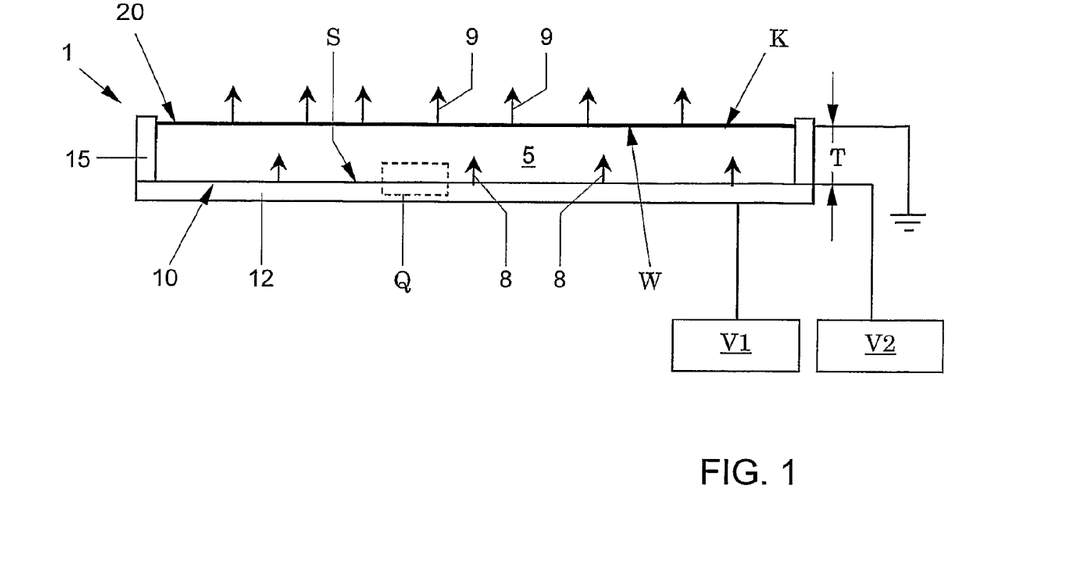
FIG. 1 schematically depicts a cross-section of an embodiment of the invention.

The device 1 is provided with a field emission cathode 10 configured to emit electrons (depicted by arrows 8) when an electrical field is applied to the cathode 10. The device 1 further comprises an anode 20, the anode 20 being configured to generate X-rays (depicted by arrows 9) as a result of receiving electrons from the field emission cathode 10.

The anode 20 can be configured in various ways and be made of various materials. For example, the anode can be a relatively flat disc or thin foil, for example a foil having a thickness of about 0.1 mm or a similar small thickness, which can depend amongst others on the configuration of the cathode 10. The anode 20 preferably comprises a material of high atomic weight, for example tungsten, as will be clear to the skilled person. For example, the anode 20 can comprise or be made of tungsten, molybdenum, tantalum, and/or different suitable material.

In the present embodiment, a vacuum space 5 extends between the electron emission surface S of the cathode and the X-ray generating anode 20. Particularly, the cathode 10 and anode 20 extend substantially parallel to each other, however, other configurations are also possible.

In the present embodiment, the device 1 comprises a structure, particularly a side wall 15, which holds the anode 10 and cathode 20, and which encloses the vacuum space 5 together with the anode 10 and cathode 20. For example, the side wall can 15 be made of alumina ($Al_2O_3$), and/or can comprise other suitable material(s). The side wall 15 can be shaped and dimensioned in various ways. For example, the side wall 15 can have a circular inner contour, to provide a substantially cylindrical vacuum space. Also, the side wall 15 can be provided by several wall sections enclosing angles with each other, for example to provide a vacuum-space having a rectangular or square shape.

In a further embodiment, for example, the cathode 20 and anode 10 can be joined to an alumina side wall 15 by active brazing, by anodic bonding, and/or by a different method.

As is shown in FIG. 1, the device can comprise a first electrical potential source V1, or be connectable to a first potential source V1, to induce or provide electron field emission from the cathode 10. In the present embodiment, the first potential source V1 is connected to a (field emission) cathode layer 11 of the cathode (see below). Also, for example, the device can comprise a second electrical potential source V2, or be connectable to a second potential source V2, for example to provide and/or control an electrical potential difference between the electron emission surface of the cathode 10 and the anode 20, and particularly to provide a gated electron field emission. In the present embodiment, this second potential source V2 is electrically connected to a top layer 13 (see FIG. 2) of the cathode 10. Besides, as FIG. 1 shows, the anode 20 can be electrically grounded during use, or be otherwise connected or be provided in an electric circuit for the generation of X-rays. For example, good results can be obtained in case the first potential source V1 applies a voltage in the range of about −70 kV to −20 kV to the cathode. Also, for example, good results can be obtained in case the second potential source V2 applies such a voltage to the top (gate) layer 13 of the cathode 10 during use, that a potential difference between the top layer 13 and the (field emission) cathode layer 11 is in the range of about 5 to 100V. For example, the potential provided by the second source V2 equals the potential of the first source V1 plus about 5 to 100 V. Preferably, one or both potential sources V1, V2 are adjustable or controllable, for adjusting a flux of electrons E and the amount of X-rays to be generated.

Alternatively, for example, the cathode 10, or field emission layer 11, can be electrically grounded, and the anode 20 can be connected to a high voltage potential source, for example to apply an electrical potential of about +20 kV to −+70 kV to the anode 20. For example, the device can be connectable to one or more potential sources to provide a suitable potential difference between the cathode 10 and anode 20, to induce the field emission, as will be evident to the skilled person. In any case, the device can be provided with a gate (for example layer 13 in the present embodiment, as mentioned above).

For example, a potential difference between potentials applied by the first and second potential source V1, V2 can be such, that electron tunnelling through an insulator layer 12 of the cathode 10 (mentioned below) can be achieved.

Also, for example, both the anode and cathode can be coupled to suitable potential sources, to provide electron emission and preferably to provide a gated electron emission. To the skilled person it will be clear, that voltages provided by mentioned potential sources can be such relative to each other, that a mentioned electron emission can be achieved.

The thickness T of the device 1 can be relatively small. This thickness, which is about the same as the height of the side wall 15, is indicated by arrows T in FIG. 1. For example, this thickness can be about 1 to 2 cm, or smaller than 1 cm. Also, the device can be dimensioned differently, as will be clear to the skilled person.

In the present embodiment, the cathode 10 comprises a substantially flat electron emission surface S extending opposite the anode 20. Particularly, the electron emission surface S of the cathode is a substantially continuous, substantially uninterrupted, smooth 2-dimensional surface, which contains substantially no sharp features. The electron emission surface can be defined or surrounded by an edge, wherein during use electron are emitted substantially from each part of the surface S and not from the edge (or boundary/perimeter) of the surface. In a further embodiment, the surface area of the electron emission surface S of the cathode can be larger than 1 $mm^2$, for example about 10 $mm^2$ or larger, for example a surface measuring at least 10 mm×10 mm in two orthogonal directions, or larger. Alternatively, the surface area of the electron emission surface of the cathode can be equal to or smaller than 1 $mm^2$, for example being in the range of 10×10 microns to 0.1×0.1 mm, or in the range from 0.1×0.1 mm to 1×1 mm.

In the present embodiment, the electron emission surface S of the cathode 10 extends along a virtual, substantially flat 2-dimensional plane, along two orthogonal directions. Alternatively, the device can be configured such, that the cathode extends along a substantially curved plane. In the latter case, for example, the cathode can have a substantially cylindrical or spherical electrical emission surface, or a different shape. For example, the anode can then be configured to extend substantially concentric with respect to the electron emission surface of the cathode.

Besides, the anode 20 can comprise an electron receiving surface W which faces the electron emission surface of the cathode. For example, the surface area of the electron receiving surface W of the anode can be larger than 1 $mm^2$, and particularly larger than about 10 $mm^2$, for example being at least 10×10 mm in two orthogonal directions. Alternatively, the surface area of the electron receiving surface W can be equal to or smaller than 1 $mm^2$, for example being in the range of 10×10 microns to 0.1×0.1 mm, or in the range from 0.1×0.1 mm to 1×1 mm.

In the present embodiment, the electron receiving surface of the anode 20 extends substantially parallel to the electron emission surface of the cathode. Besides, the present anode 20 comprises an X-ray emission surface K which emits the X-rays during use, for example an electron emission surface which is faced away from the cathode.

In the embodiment of FIGS. 1-4, the cathode 10 is configured to emit the electrons 9 substantially from the electron emission surface S during use. Particularly, the cathode 10 is configured to direct a single electron beam towards the anode, the beam having a cross-section larger than 1 $mm^2$, measured in parallel with respect to the emission surface at the emission surface, and particularly a cross-section of about 10 mm² or larger. To this aim, the cathode 10 can be configured in various ways.

In the present embodiment, the cathode 10 can be configured such that during use, the electron emission can be mainly controlled by the Fowler Nordheim (FN) tunnelling through an insulator barrier 12, and not by tunnelling through a surface barrier from the cathode surface S to the vacuum 5. Particularly, in the present device 1, the cathode 10 is configured to emit the electrons 8 substantially in a direction perpendicular to the electron emission surface.

Figure 2:
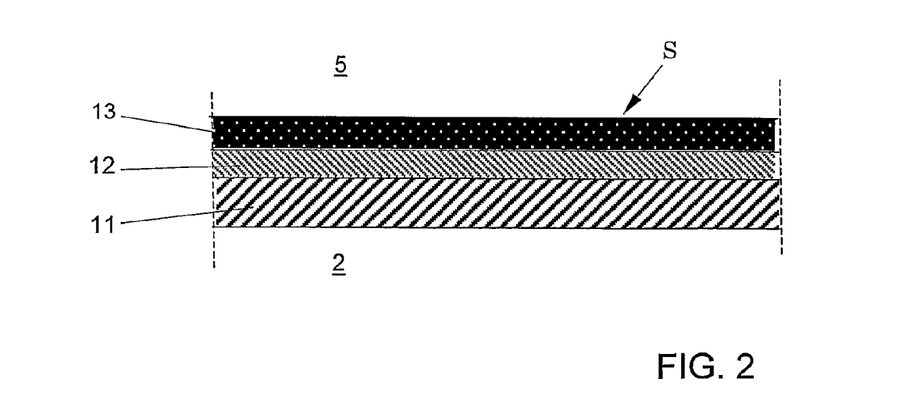
FIG. 2 is a detail Q of FIG. 1.

In a further embodiment, the cathode 10 comprises at least one electrically insulating part or insulator barrier 12, wherein the device is configured such, that electrons tunnel through the at least one insulating part 12 towards the electron emission surface S of the cathode, due to a suitable electrical field (which is provided by the potential sources V1, V2 in the present embodiment). Besides, in a further embodiment, the field emission cathode 10 can comprise one or more layers or coatings 11, 12, 13 being provided on a substrate 2. For example, the field emission cathode 10 can be substantially made of a number of sub-micron thick layers 11, 12, 13. For example, in the present embodiment, the electron emission can be mainly controlled by, or is substantially dependent of, an electron tunnelling from cathode layer 11 to a gate 13, through a (preferably one or several nanometers thin) insulating barrier 12, and for example not by tunnelling from a relatively thick cathode surface-to-vacuum barrier.

FIG. 2 depicts part of an embodiment of the cathode 10 of the device 1 in more detail, in cross-section. In this embodiment, each of the layers 11, 12, 13 is a substantially homogeneous, uninterrupted layer 11, 12, 13, which does not contain sharp features such as tips or cones, or edges of small openings.

In the embodiment of FIG. 2, the cathode 10 at least comprises a first conducting or semiconductor layer 11, wherein the first conducting or semiconductor layer 11 is connected or connectable to the first potential source V1 to apply the electrical field to the cathode to induce the electron field emission. The cathode 10 further comprises a second conducting or semiconductor layer 13, being separated from the first conducting or semiconductor layer 11 by electrically insulating material, particularly by an electrically insulating layer 12. In this embodiment, the electron emission surface S, where electrons 8 can be emitted into the vacuum towards the anode 20 during use, is a surface of the second conducting or semiconductor layer 13. For example, the cathode 10 can be a MIM (metal-insulator-metal)-electron emitter or a BEE electron emitter. For example, a metal-insulator-metal emitter as such is described in the book written by Wei Zhu titled Vacuum Micro-Electronics (2001, pag. 278). As an example only, the cathode 10 can be configured to provide an electron current of about 10 mA/cm2 or less, or 1 mA/cm2 or less, during use. In the embodiment of FIG. 2, the cathode 10 is provided substantially by relatively thin, homogeneous, uninterrupted layers 11, 12, 13. Thus, the overall cathode 10 can also be made relatively thin.

The cathode layers 11, 12, 13 can be made of various materials. For example, in a MIM cathode 10, each of the conducting layers 11, 13 can be made of various metals, for example gold (Au), platinum (Pt), titanium (Ti), aluminium, iridium (Ir), and/or other metals. As a non limitative example, in the embodiment of FIG. 2, a first conducting layer 11 that is provided onto the substrate 2 can be aluminium or titanium. A second conducting layer 13 that is provided on the other side of the intermediate insulator layer 12, can comprise or consist of gold, iridium and/or platinum. In a BEE cathode 10, various semiconductors can be applied, for example nanocrystalline porous silicon or doped diamond, as will be clear to the skilled person. Each of the conducting layers 11, 13 can also have a compound layer structure, and can comprise a stack of layers of conducting materials. The second conducting layer 13 can be made relatively thin, for example in the range of about 1-20 nm. The first conducting layer 11 can have various thicknesses (measured in the direction of the arrows T in FIG. 1). For example the thickness of the first conducting layer can range from about 10 nm to several mm or more.

Also, for example, the first layer 11 can be or act as a substrate 2 as such, or be integrated with the above-mentioned substrate 2. For example the device can be made using a aluminum substrate of several mm thickness, and providing an insulating layer (for example an Al2O3 layer) 12 on the aluminum substrate 2, 11, for example via anodizing part of the aluminum layer or substrate.

Besides, on a substrate 2, which does not have to be an Aluminum substrate, a thin layer 11 of aluminum can be provided, for example about 100 nm Al or an aluminum layer having a different thickness, via a suitable deposition method, for example vapor deposition or sputtering. A top part of such an aluminum layer 11 can then be simply provided with the insulating layer 12, for example via anodizing a suitable part of the aluminum layer.

The electrically insulating layer 12, extending between the first and second conducting or semiconductor layer, can also be provided with various materials. A suitable material to be applied in the insulating layer 12 is $Al_2O_3$, as is mentioned above, however, it will be clear that the insulator layer 12 can also comprise various other materials or compounds. The insulating layer 12 is preferably relatively thin, for example in the range of about 1-20 nm, or for example about 10 nm, as will be clear to the skilled person.

The substrate 2 can also comprise or consist of various materials, for example glass, insulator material, semiconductor material, silicon, plastic and/or other suitable materials.

During use of the embodiment of FIG. 1-2, the potential sources V1, V2 applie a suitable electric field to the first cathode layer 11, such that electrons tunnel from the first conducting or semiconductor layer 11 through the electrically insulating material 12, to the conducting or semiconductor parts or a second conducting or semiconductor layer 13, to be emitted via the electron emission surface. An electric field provided between the cathode 10 and anode 20, in the present embodiment the electrical field provided by the second potential source V2 with regard to the grounded anode 20, can serve to further accelerate emitted electrons towards the anode 20.

The electron emitter 10 can exhibit a substantially fluctuation free emission current, an uniform emission from the whole emitter area S and a highly directional electron beam, particularly directional towards the opposite anode 20. Furthermore, the cathode 10 can be inherently resistant to surface contamination, because in the present embodiment, the electron emission can be mainly controlled by the Fowler Nordheim (FN) tunnelling through the insulator barrier, as mentioned above. Also, the vacuum requirements concerning the vacuum 5 of the present embodiment are relatively low compared to known X-ray generating devices.

Figure 3:
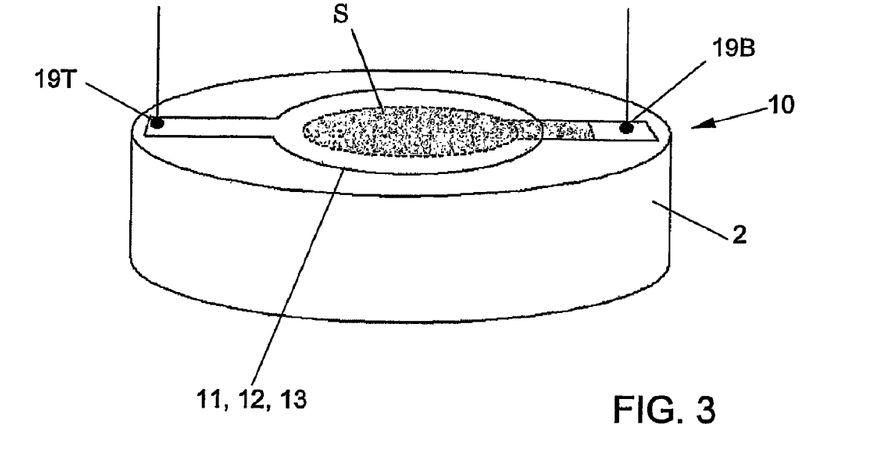
FIG. 3 is a perspective top view of part of a further embodiment of the invention.
Figure 4:
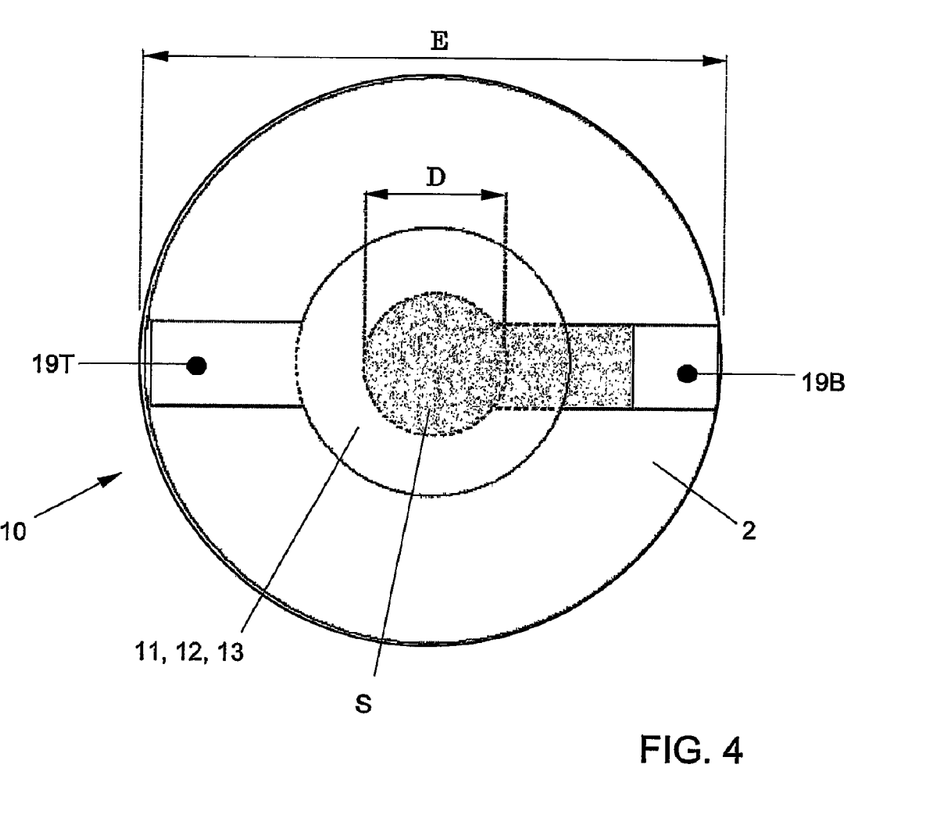
FIG. 4 is a top view of the embodiment part depicted in FIG. 3.

FIGS. 3 and 4 show further embodiments of part of the device. As is depicted in FIGS. 3-4, for example, the substrate 2 can be a substantially cylindrical disc. As a non limitative example, a diameter of the substrate can be at least 1 to 2 cm, or larger. A base electrode 19B can be provided, which is in electrical contact with the first conducting or semi-conducting layer 11 that has been provided on a surface of the substrate 2. Also, the device can include a top electrode 19T, which is in electrical contact with the first conducting or semi-conducting layer 13. For example, as is indicated in FIG. 4, in a further embodiment, the electron emission surface S can be a substantially circular flat surface, having a diameter E, which diameter E can be about 1 mm, and preferably about 5 mm or larger.

The substrate can also be shaped differently, for example to provide a curved cathode. In that case, the substrate may be substantially cylindrical or spherical, or be shaped differently.

Figure 5:
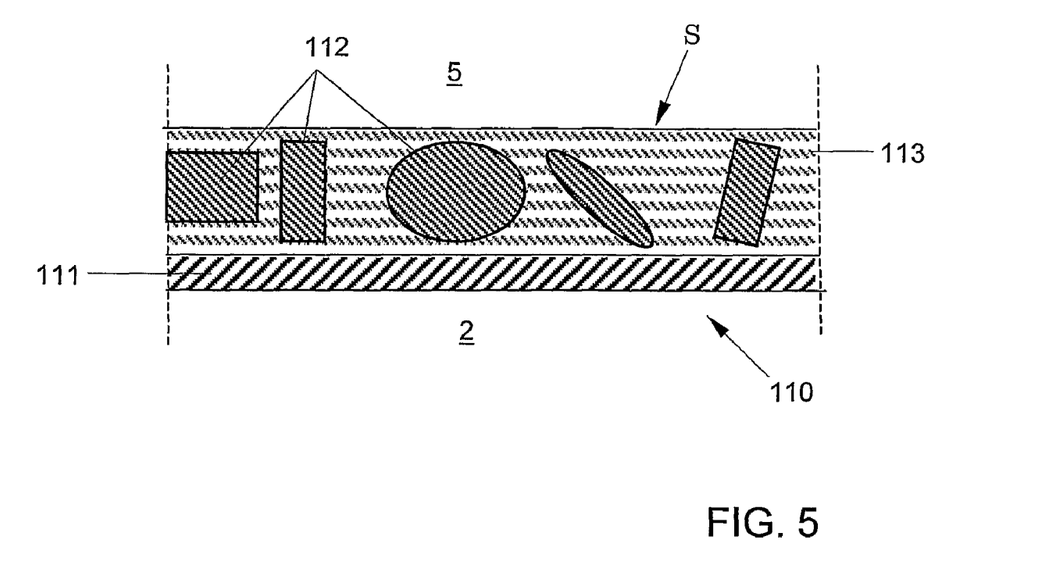
FIG. 5 is a view similar to FIG. 2, of a detail of an other embodiment of the invention.

FIG. 5 shows part of a cathode of a further embodiment of the invention. The embodiment of FIG. 5 differs from the embodiment shown in FIG. 2, in that the cathode 110 is provided with a first layer, which is a conducting layer 111, which can be carried by a substrate 2. A second layer 112 is provided onto the conducting layer 111, at the side that is faced away from the substrate 2. In the embodiment of FIG. 5, the second layer 112 comprises insulating material. The second layer 112 abuts the vacuum space 5, and can face the anode electron receiving surface W (see also FIG. 1). Thus, in the embodiment of FIG. 5, the substantially uninterrupted, smooth electron emission surface of the cathode 110 is a surface of the second layer 112. To provide a desired field emission, in the FIG. 5 embodiment, the cathode 110 further comprises conducting or semiconductor parts or particles 113, being separated from the first conducting or semiconductor layer 111 by the electrically insulating material of the second layer 112. Particularly, the conducting or semiconductor parts or particles 113 are embedded within, or encapsulated by the insulating material of the second layer 112. In the embodiment of FIG. 5, the conducting/semiconducting parts or particles 113 can be substantially randomly distributed through the insulating material 112, and with respect to the electron emission surface S. For example, the conducting/semiconducting parts or particles 113 can serve as electron emission inducing parts or particles, and can provide local MIM or BEE electron emission structures. The device can be configured such that at various locations, the conducting/semiconducting parts or particles 113 are be spaced-apart from each other and/or from the first layer 111 and vacuum 5 by small distances, for example by one or several nanometers, to provide electron tunnelling channels.

In the embodiment of FIG. 5, for example, the parts or particles 113 of the second layer can have various shapes and dimensions. The can be, for example needle-shaped, plate-shaped and/or be shaped differently. For example, these the parts or particles 113 can have lengths or diameters of about 1-10 micron, or different dimensions. Also, for example, a thickness of the second layer of the FIG. 5 embodiment, measured perpendicularly to the emission surface S, can be about 1-10 microns, or be a different thickness.

During use of the embodiment of FIG. 5, the cathode 110 is subjected in an electric field, such that electrons travel from the first layer 111 and across second layer 112 into the vacuum 5 to wards the anode 20. Electron transport through the composite second layer 111 can be expedited by careful choice of the particle and matrix material of the layer.

An embodiment as shown in FIG. 5 can advantageously be manufactured using a printing method. Thus, the cathode 110 can be a printable field emitter (PFE). For example, during the manufacturing, a field emitting ink can be applied onto a substrate 2 and/or electrode 111 to provide the second layer 112, comprising the insulating material having embedded conducting/semiconducting parts or particles 113. Suitable low cost printable field emitting vacuum compatible inks are known from the art, see for example A. P. Burden, Solid-State Electronics 45 (2001) 987. As an example, the ink, to be printed onto the substrate, can comprise polycrystalline diamond, amorphous carbon, amorphous silicon and/or boron nitride, in a epoxylite resin. Particularly, at least the second layer part 112, 113 of the cathode 110 can be provided using inkjet printing, wherein an ink comprising the conducting and/or semiconductor particles 113 is being printed onto a substrate and/or onto an electrode. The printing method can include a spin-coating step, to flatten and/or distribute a respective printed coating or layer.

Figure 6:
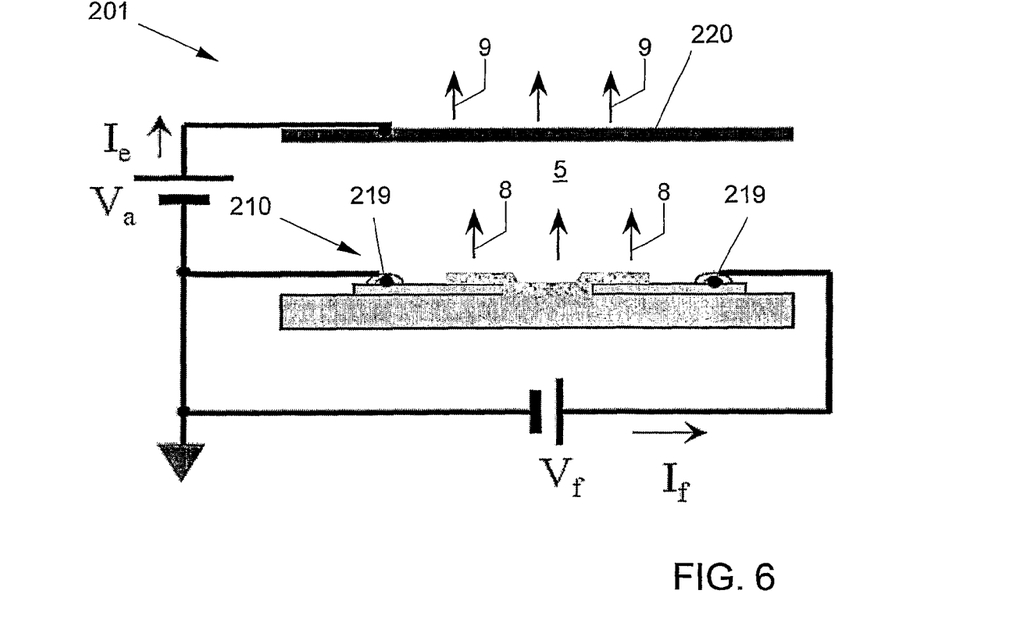
FIG. 6 is a view similar to FIG. 1 of yet another embodiment of the invention.
Figure 7:
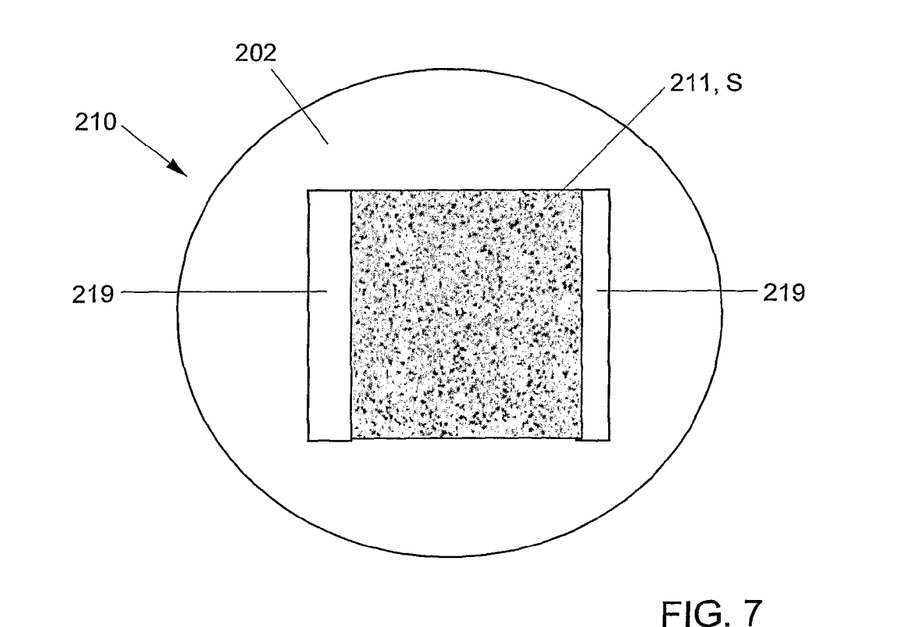
FIG. 7 is a top view of part of a cathode part of the embodiment shown in FIG. 6.

FIGS. 6 and 7 show a further embodiment, which differs from the embodiments described with respect to FIG. 2, in that the cathode 210 is a surface conduction electron emitter (SCE). An SCE as such, to be applied in a flat panel display, is known from the prior art, see for example C. G. Xie, "Can Nanotechnology revive Field Emission Display Technology", Jan. 31, 2005, E. Yamaguchi, et. al. SID Digest (1997) 52.

In the present embodiment, the cathode 210 can be provided with a cracked, flat ultrafine particle film 211, and electrodes 219 to apply a potential difference to the ultrafine particle film 211, such, that the potential difference can induce an electric current to flow substantially in parallel with that film 211 through that film or layer, to provide electron emission from that film 211. In this embodiment, an electron emission surface, which extends opposite the anode 220 and abuts an intermediate vacuum space 5, is a surface of the flat film 211. For example, a first potential source $V_f$ can be provided to apply the mentioned potential difference to the film 211. A second potential source $V_a$ can be provided, which is connected or connectable to the anode 220 to provide a potential difference between the cathode 210 and anode 220, for example to accelerate electrons 8, that have been emitted by the cathode 210, towards the anode 220.

For example, in the present embodiment, the electrons are emitted in multiple (millions) of cracks—so on the edges of the remaining material. The electrons are then accelerated perpendicular to their initial tunnelling direction towards the anode. As there are so many cracks, this embodiment can be seen as providing a multitude of line sources combining into a homogeneous surface emission.

In the embodiment 201 of FIGS. 6-7, the SCE particle film or layer 211 can be a conducting or semiconductor layer, which layer is being interrupted or broken, viewed in a direction parallel to the layer, to provide the surface conduction emitter. Particularly, the film 211 is cracked in many locations, and the cracks are nano-scale cracks or defects. For example, the SCE film 211 can be made of palladium oxide (PdO), or a different material. Surface conduction emission (SCE) is a phenomenon in which electrons are emitted from the cathode 210 when electric current flows through the cathode 210 in parallel with the cathode surface. During use of the FIG. 6-7 embodiment, electrons can cascade across from one electrode to another and can jump free of the material and be accelerated to the overlying anode 220 across the vacuum gap 5. To manufacture the device shown in FIG. 6-7, for example the film 211 can be applied to a substrate 202 using a printing method.

It has been found that devices such as MIMs, PFEs, BEEs and SCEs are suitable the be used to provide, preferably flat, X-ray sources. In the BEE, PFE and MIM embodiments, the field emission part of the cathode can be substantially 'buried' under isolating material, and be separated from the vacuum 5. This makes the respective cathode less sensitive to contamination, and can provide a substantially constant electron emission (and therefore X-ray emission). The present device can be made relatively cheap, for example compared to devices which have carbon-nanotubes extending into an vacuum. Also, the construction of the device can be relatively simple. For example, in an above-described MIM or BEE embodiment (see FIG. 2), a gate can be built in, and does not have to be produced separately. Also, such a gate can be used to provide a relatively stable electronflux, leading to a relatively stable X-ray flux during use. Also, in the present device, the emission of the electrons can be achieved at a relatively low temperature. The device can be provided with relatively large electron and/or X-ray emission surfaces. Also, as is already mentioned above, in a further embodiment, the device can be provided in a substantially cylindrical shape, for example to provide an X-ray source which can distribute the X-rays in a cylindrical fashion.

While specific embodiments of the invention have been described above, it will be appreciated that the invention may be practiced otherwise than as described. The descriptions above are intended to be illustrative, not limiting. Thus, it will be apparent to one skilled in the art that modifications may be made to the invention as described without departing from the scope of the claims set out below.

It is to be understood that in the present application, the term "comprising" does not exclude other elements or steps. Also, each of the terms "a" and "an" does not exclude a plurality. Any reference sign(s) in the claims shall not be construed as limiting the scope of the claims.

The invention claimed is:

1. A device for generating X-rays, comprising:
a field emission cathode configured to emit electrons when an electrical field is applied to the cathode; and
an anode, the anode being configured to generate X-rays as a result of receiving electrons from the field emission cathode;
wherein the cathode comprises an electron emission surface extending opposite the anode, the cathode being configured to emit electrons substantially from the electron emission surface during use,
wherein the cathode is a metal-insulator-metal (MIM) emitter having at least one electrically insulating part extending between conducting metal parts, and
wherein the device is configured such that electrons tunnel through the at least one insulating part towards the electron emission surface of the cathode due to the electrical field applied to the cathode during use.

2. The device according to claim 1, wherein the cathode at least comprises a first metal layer, wherein the first metal layer is connected or connectable to a potential source, or to ground, to apply an electrical field to the cathode to induce the electron field emission.

3. The device according to claim 1, wherein the cathode is configured to direct an electron beam towards the anode, the beam having a cross-section larger than 1 mm$^2$, measured in parallel with respect to the emission surface at the emission surface, and wherein the surface area of the electron emission surface of the cathode is preferably larger than 1 mm$^2$.

4. The device according to claim 1, wherein the anode comprises an electron receiving surface which faces the electron emission surface of the cathode, wherein the surface area of the electron receiving surface of the anode is preferably larger than 1 mm$^2$.

5. The device according to claim 4, wherein the electron receiving surface of the anode extends substantially parallel to the electron emission surface of the cathode.

6. The device according to claim 1, wherein the cathode is a substantially flat and/or thin cathode.

7. The device according to claim 1, wherein the electron emission surface of the cathode is a substantially continuous, uninterrupted surface.

8. The device according to claim 1, wherein the surface area of the electron emission surface of the cathode measures at least 10 mm×10 mm in two orthogonal directions.

9. The device according to claim 1, wherein the field emission cathode comprises one or more layers being provided on a substrate.

10. The device according to claim 1, wherein the field emission cathode is substantially made of a number of sub-micron thick layers.

11. The device according to claim 1, wherein the cathode comprises metal parts or a second metal layer, being separated from a first metal layer by electrically insulating material, wherein electrons tunnel from the first metal layer through the electrically insulating material, to the metal parts or a second metal layer during use.

12. The device according to claim 11, wherein the cathode comprises:
a second metal layer;
an electrically insulating layer extending between the first and second metal layer, wherein the electron emission surface is a surface of the second metal layer.

13. The device according to claim 11, wherein the cathode comprises a first and a second layer, the first layer being a metal layer, the second layer comprising electrically insulating material, wherein conducting parts and/or particles are embedded in the insulating material of the second layer, wherein the electron emission surface is a surface of the second layer.

14. The device according to claim 1, wherein at least part of the cathode is manufactured using a printing method comprising applying a field emitting ink onto a substrate and/or electrode.

15. The device according to claim 1, further comprising a vacuum space extending between the electron emission surface of the cathode and the X-ray generating anode.

16. The device according to claim 1, further comprising at least one potential source, and/or being connectable to at least one potential source, to provide an electrical potential difference between the electron emission surface of the cathode and the anode to provide a gated electron field emission.

17. The device according to claim 1, further comprising at least one potential source, and/or being connectable to at least one potential source, to apply the electrical field to the cathode to induce the electron field emission.

18. The device according to claim 1, wherein the electron emission surface of the cathode extends along a virtual surface that is a substantially cylindrical or spherical plane.

19. A method for irradiating at least part of a species and/or tissue with X-rays wherein the irradiating is carried out using a device comprising:
a field emission cathode configured to emit electrons when an electrical field is applied to the cathode; and
an anode, the anode being configured to generate X-rays as a result of receiving electrons from the field emission cathode;
wherein the cathode comprises an electron emission surface extending opposite the anode, the cathode being configured to emit electrons substantially from the electron emission surface during use,
wherein the cathode is a metal-insulator-metal (MIM) emitter having at least one electrically insulating part extending between conducting metal parts, and
wherein the device is configured such that electrons tunnel through the at least one insulating part towards the electron emission surface of the cathode due to the electrical field applied to the cathode during use.

20. A method for manufacturing a device for generating X-rays, the method comprising:
  providing a substrate;
  providing the substrate with one or more layers to provide an electron field emission cathode, the cathode being a metal-insulator-metal (MIM) cathode configured to emit electrons from substantially from an electron emission surface of the cathode; and
  providing an anode, configured to generate X-rays as a result of receiving electrons from the cathode;
  characterized in that the cathode comprises at least one electrically insulating part, wherein the device is configured such that electrons tunnel through the at least one insulating part towards the electron emission surface of the cathode due to the electrical field applied to the cathode during use.

21. The method according to claim 20, wherein at least part of the cathode is being provided using a printing technique wherein an ink comprising conducting and/or semiconductor particles is printed onto a substrate and/or onto an electrode.

22. The method according to claim 20, wherein at least one layer of the cathode is a conducting layer, which layer is interrupted or broken, at least viewed in a direction parallel to the layer, to provide a surface conduction emitter.

23. A device for generating X-rays, comprising:
  a field emission cathode configured to emit electrons when an electrical field is applied to the cathode; and
  an anode, the anode being configured to generate X-rays as a result of receiving electrons from the field emission cathode;
  wherein the cathode comprises an electron emission surface extending opposite the anode, the cathode being configured to emit electrons substantially from the electron emission surface during use, wherein the cathode comprises a surface conduction electron emitter, which includes a layer of surface conduction emission material and electrodes to apply a potential difference to the surface conduction emission material, for inducing an electric current to flow in parallel with the layer of surface conduction emission material through that layer, to provide electron emission from the surface conduction emission material.

* * * * *